BEST AVAILABLE COPY

W. M. CONGER,

Assignor to W. WESTLAKE.

Supporting-Platform.

No. 8,985. Reissued Dec. 2, 1879.

*Witnesses:*

Henry Eichling

Robert H. Duncan

*Inventor:*

Walter M. Conger by Saml. A. Duncan

Att'y.

N. PETERS, PHOTO-LITHOGRAPHER, WASHINGTON, D. C.

UNITED STATES PATENT OFFICE.

WALTER M. CONGER, OF NEWARK, N. J., ASSIGNOR TO WILLIAM WESTLAKE.

IMPROVEMENT IN SUPPORTING-PLATFORMS.

Specification forming part of Letters Patent No. 126,676, dated May 14, 1872; Reissue No. 8,985, dated December 2, 1879; application filed July 9, 1879.

*To all whom it may concern:*

Be it known that I, WALTER M. CONGER, of the city of Newark, in the county of Essex and State of New Jersey, have invented a new and useful Improvement in Supporting Platforms or Stands; and I do hereby declare the following to be a full, clear, and exact description of the same.

The object of this invention is to obviate the main objections which have heretofore existed in stands or platforms made of a single thickness of sheet metal without employing supplemental supports or frames of wood or other material.

The objections referred to in such platforms are, the want of sufficient rigidity to prevent them from becoming distorted and warped in handling, transportation, and storage, and the fact that when in use their edges curl or become bent upward, thus presenting an obstruction to the feet of passers, and forming a receptacle underneath, from which dirt and dust cannot readily be removed.

The present invention aims to overcome these objections by constructing the platform with a beaded edge which comes down onto the floor, and with a prominent rim or raised border near its edge, which greatly increases its rigidity and fixes its shape; also, in arranging the central part of the platform, which is to receive the body to be supported in a plane slightly higher than that of the beaded edge, so that the edge will be pressed down upon, and held in close contact with, the floor or carpet by the weight resting upon such central part.

Figure 1:
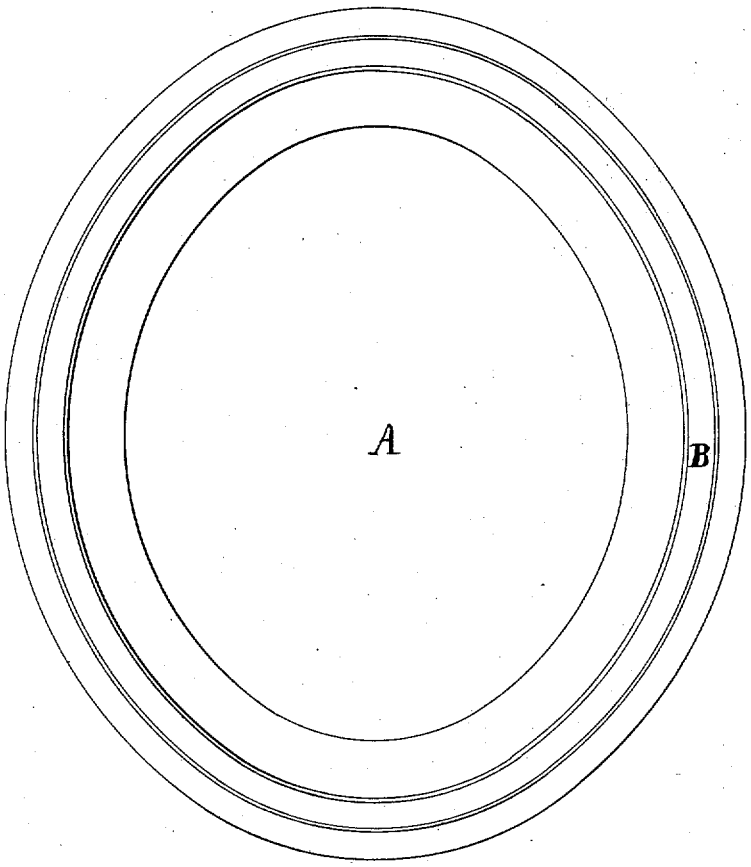
Figure 2:
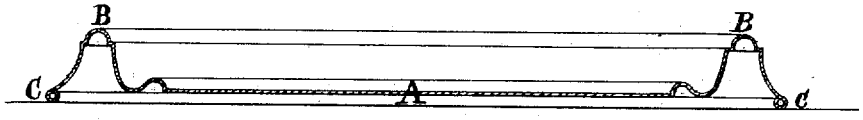

In the accompanying drawings, forming a part of this specification, Figure 1 is a plan view of the platform, and Fig. 2 is a cross-section of the same.

In these figures, A represents a central surface, designed to receive the article to be supported; B, a prominent rim or raised border surrounding this central part, and C a bead formed upon the edge of the platform and furnishing a smooth and stiff support or rest therefor.

This stand or platform is made from a single thickness of sheet metal, and preferably from a single piece, and is brought into the required shape by any means adapted thereto, as by the use of properly-constructed dies, or by spinning it over formers or chucks of the reverse pattern of the platform, both being well-known methods of forming up sheet metal.

The central part, A, is of a size to accommodate the articles to be supported, and is preferably circular or oval in shape.

The rim B is formed by bending the sheet metal upward from the plane of the part A, and then downward. Preferably the slope of both the inner and the outer side of the rim thus formed should be gradual, and either or both may be ornamented with small beadings or moldings. It is considered that if the inclination of the two sides be such that the width of the rim at its base is about equal to its height, as shown in the drawings, the maximum of strength and rigidity to resist blows or pressure or strain will be secured.

The beaded edge C is formed by turning or folding the extreme periphery of the sheet of metal of which the platform is made over upon itself, the ends to be accomplished thereby being to provide a smooth bearing-edge, free from liability to cut or tear the floor or carpet, and sufficiently stiff not to be crushed by the weight which it is required to sustain, and at the same time occupying a lower plane than the central part of the platform. Preferably this edge can be formed by bending the periphery of the sheet of metal around a wire, producing what is known as a "wired edge," or, in case a wire is not used, by bringing the periphery of the sheet of metal into substantially the same form it would take if bent around a wire—that is, a tube-like form—the free edge being turned upward, so that it will not come in contact with the carpet or floor.

It is considered that this form of edge is the best to resist downward pressure, as well as to give additional stiffness to the platform when it is handled by taking hold of its edge, as is most convenient, or when it is placed in an upright or inclined position, as is customary in storage or transportation.

The platform should be so constructed that when no weight is upon it the central part, A, will lie in a plane slightly higher than the edge C, and thus be unsupported, except through such edge. With this construction the tendency of a heavy weight placed upon the part A will be to bring it down upon the floor, and this will force the edge C down into close contact with the floor, and, as this edge has been materially stiffened, this contact practically will be perfect all the way around.

It is readily perceived that the subject-matter of the present invention differs materially from platforms in which sheet-metal coverings have been combined with interior supporting bodies, or which have been made with a metallic edge or rim sufficiently rigid to be unyielding under the pressure of the supported body, as described or shown in patents granted William Westlake, March 21, 1871, No. 112,996, and October 3, 1871, No. 119,676, and to Clark Brownell, July 26, 1870, No. 105,773. In these inventions supports were placed directly under the supported body, which prevented its weight from being transmitted to the edge or rim; or, as might have been the case in the Brownell construction, if the supports were dispensed with the edge or rim was unyielding by reason of being of heavy iron, so that it would have no tendency to become distorted in shape when placed upon the floor or in other positions; and there was no intimation that these inventions could be carried out without using interior supports with the sheet-metal coverings, and in all cases in which the sheet-metal covering was turned under the platform it was for the purpose of binding together the covering and the interior supports or lining, and not for the purpose, as in the present invention, of forming out of the turned-over portion of the sheet metal a bearing-edge capable of sustaining the pressure placed upon the platform, or any part thereof.

The present invention, as distinguished from all preceding constructions, so far as known, provides for the construction of a cheap and efficient platform from a single piece of thin sheet metal so disposed as to give the desired stiffness not only to the edge but to the entire structure without using any additional supports or interior lining, and to cause its edge, when in use, to be brought and kept in close contact with the surface on which it rests.

The central portion, A, may be covered with paper, cloth, felt, wood, or any analogous material, and such material, if desired, may be cemented directly to the sheet metal.

What is claimed as new is—

1. As a new article of manufacture, a stand or platform made of a single thickness of sheet metal, and consisting of a central part to receive the body to be supported, a raised rim or border surrounding the same, and a beaded edge formed by turning the periphery of the sheet metal over upon itself or around a wire, substantially as and for the purpose described.

2. The combination, in a stand or platform made of a single thickness of sheet metal, of a beaded edge formed by turning the periphery of the sheet metal over upon itself or around a wire and a central supporting-surface raised above the plane of such edge, substantially as and for the purpose described.

3. The combination, in a stand or platform made of a single thickness of sheet metal, of a beaded edge formed by turning the periphery of the sheet metal over upon itself or around a wire, a central supporting-surface raised above the plane of such edge, and a raised rim or border interposed between the beaded edge and such central part, substantially as and for the purpose described.

WALTER M. CONGER.

Witnesses:

JAMES CARR,

BENJ. A. SMITH.